United States Patent [19]

Takago et al.

[11] Patent Number: 5,314,981

[45] Date of Patent: May 24, 1994

[54] ROOM TEMPERATURE CURABLE ORGANOPOLYSILOXANE COMPOSITION AND CURED PRODUCT OF THE SAME

[75] Inventors: Toshio Takago; Shinichi Sato; Hitoshi Kinami; Hirokazu Yamada, all of Annaka, Japan

[73] Assignee: Shin-Etsu Chemical Co., Ltd., Tokyo, Japan

[21] Appl. No.: 37,322

[22] Filed: Mar. 26, 1993

[30] Foreign Application Priority Data

Mar. 27, 1992 [JP] Japan .................................. 4-140878

[51] Int. Cl.$^5$ ............................................ C08G 77/24
[52] U.S. Cl. ........................................ 528/36; 528/17; 528/21; 528/42
[58] Field of Search ................ 528/42, 36, 21, 17

[56] References Cited

U.S. PATENT DOCUMENTS

| | | | |
|---|---|---|---|
| 4,100,136 | 7/1978 | Carter et al. | 528/42 |
| 5,013,800 | 5/1991 | Inoue | 525/477 |
| 5,073,422 | 12/1991 | Konno et al. | 528/42 |

FOREIGN PATENT DOCUMENTS

0166363 1/1986 European Pat. Off. .
0488709 6/1992 European Pat. Off. .

Primary Examiner—Melvyn I. Marquis
Attorney, Agent, or Firm—Oblon, Spivak, McClelland, Maier & Neustadt

[57] ABSTRACT

A room temperature curable organopolysiloxane composition comprising: (A) 100 parts by weight of a diorganopolysiloxane blocked by hydroxyl group at both terminal ends of its molecule, (B) from 0.5 to 30 parts by weight of an organosilicon compound having at least three silicon-bonded hydrolyzable groups in its molecule or a partially hydrolyzed product of the organosilicon compound, (C) from 0.1 to 15 parts by weight of an alkoxysilane having the following general formula (1):

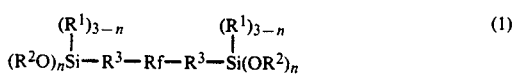

wherein $R^1$ and $R^2$ are each an unsubstituted or substituted monovalent hydrocarbon group of from 1 to 8 carbon atoms, $R^3$ is a divalent hydrocarbon group of from 1 to 8 carbon atoms which may contain an amide linkage (—CONH—) or ether oxygen linkage, Rf is a divalent perfluoroalkylene group or a divalent perfluoropolyether group, and n is an integer from 1 to 3, and a cured product of the composition. The composition and the cured product thereof ensure lessened contamination on surfaces of the cured product and in the surroundings, and permit easy removal of fungi, if any, from surfaces of the cured product.

10 Claims, 1 Drawing Sheet

ROOM TEMPERATURE CURABLE ORGANOPOLYSILOXANE COMPOSITION AND CURED PRODUCT OF THE SAME

BACKGROUND OF THE INVENTION

1. Field of the Invention

The present invention relates to a room temperature curable organopolysiloxane composition which readily cure under the action of moisture, and to a cured product of said composition. More particularly, the invention relates to a composition which does not cause contamination on surfaces of a cured product thereof or in the surroundings when used outdoors and which permits easy removal of fungi, if any, from surfaces of the cured product.

2. Description of the Prior Art

Heretofore, so-called room temperature curable organopolysiloxane compositions are known which remain stable with a flowing property under hermetically sealed conditions but which, under the action of moisture in air, cure at room temperature to form a rubber-like elastic material. This type of compositions are in extensive use as sealing material, coating material, adhesive and the like in construction, machine and electric industries.

However, these room temperature curable organopolysiloxane compositions have the disadvantage that when used as sealing material or coating material, they are liable to cause contamination on surfaces thereof or in the surroundings, thereby damaging the appearance of a building or the like. For suppressing or inhibiting such contamination, a variety of additives have been investigated and a number of methods have been proposed. For instance, there are known a method in which a surface active agent having a polyoxyethylene group, a residue group of sorbitan, a residue group of a disaccharide, or the like is used (Refer to Japanese Pre-examination Patent Publication (KOKAI) Nos. 56-76452 and 56-76453), a method in which a surface active agent having at least one fluorine atom in its molecule is used (Refer to Japanese Pre-examination Patent Publication (KOKAI) No. 58-167647), and a method in which a surface active agent having at least one fluorine atom in its molecule and an organosilicon compound having an amino group are used together (Refer to Japanese Pre-examination Patent Publication (KOKAI) No. 61-34062). However, contamination inhibitive properties given by these methods do not last long and, therefore, produce little effect on long-term contamination.

Besides, cured elastic materials obtained from known room temperature curable organopolysiloxane compositions have the drawback as follows. Although they exhibit good appearance upon application thereof, they are susceptible to contamination by various contaminants (dirt from human bodies, detergents, foods, etc.) where they are applied in a bathroom, kitchen, toilet or the like. Where these compositions are used in highly humid environments, in particular, the appearance of the applied compositions are liable to be damaged by propagation of fungi thereon.

In view of the above, as a method for imparting a mildew-proofing property to a moisture-curing type room temperature curable organopolysiloxane composition, Japanese Pre-examination Patent Publication (KOKAI) No. 54-43260 discloses addition of a benzimidazolyl alkyl carbamate to the composition, whereas Japanese Pre-examination Patent Publication (KOKAI) No. 57-18758 discloses addition of an organosilicon compound having a tetraorganoguanidyl group.

The compositions thus provided with a mildew-proofing property, however, are incapable of retaining the mildew-proofing property for a long time, because the mildew-proofing agent used will exude from the composition in the presence of water.

SUMMARY OF THE INVENTION

It is accordingly an object of the present invention to provide a composition which overcomes the above disadvantages of the prior art, does not cause contamination on surfaces of cured products thereof or in the surroundings, especially in outdoor use thereof, and permits easy removal of fungi, if any, from surfaces of cured products thereof, and also to provide a cured product of said composition.

In order to attain the above object, the present invention provides a room temperature curable organopolysiloxane composition comprising:

(A) 100 parts by weight of a diorganopolysiloxane blocked by hydroxyl group at both terminal ends of its molecule, (B) from 0.5 to 30 parts by weight of an organosilicon compound having at least three silicon-bonded hydrolyzable groups in its molecule or a partially hydrolyzed product of said organosilicon compound, (C) from 0.1 to 15 parts by weight of an alkoxysilane having the following general formula (1):

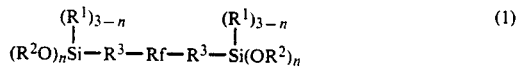

wherein $R^1$ and R monovalent hydrocarbon group of from 1 to 8 carbon atoms, $R^3$ is a divalent hydrocarbon group of from 1 to 8 carbon atoms which may contain an amide linkage (—CONH—) or ether oxygen linkage, Rf is a divalent perfluoroalkylene group or a divalent perfluoropolyether group, and n is an integer from 1 to 3.

The present invention also provides a cured product obtained by curing the above composition.

According to the present invention, for example, where the composition of the present invention is used as sealing material or coating material, it is possible to greatly reduce contamination of surfaces of cured products of the composition and in the surroundings. In addition, if the composition according to the present invention is applied in a bathroom, kitchen, toilet or the like where contamination by such contaminants as dirt from human bodies, detergents, foods, etc. and propagation of fungi tend to occur due to poor ventilation and high humidity, the composition permits easy removal of fungi.

DETAILED DESCRIPTION OF PREFERRED EMBODIMENTS

Component (A)

Figure 1:
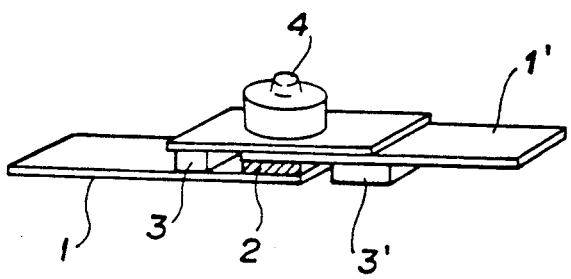
FIG. 1 is a perspective view of a specimen used in measurement of adhesive strength under shear in Examples.

The diorganopolysiloxane blocked by hydroxyl group at both terminal ends of its molecule, used as the component (A), is a compound having the following general formula (2):

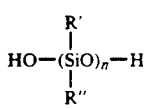

wherein R' and R" may be the same or different from each other and are each a member selected from the group consisting of alkyl groups such as methyl, ethyl, propyl and the like; cycloalkyl groups such as cyclohexyl and the like; alkenyl groups such as vinyl, allyl and the like; aryl groups such as phenyl, tolyl and the like; and groups derived from these groups by substitution of halogen atoms for part of the hydrogen atoms of these groups; and n is an integer of 10 or above, preferably an integer such that the viscosity at 25° C. of the diorganopolysiloxane is in the range from 25 to 500,000 cSt, more preferably from 1,000 to 100,000 cSt.

Component (B)

The organosilicon compound having at least three silicon-bonded hydrolyzable groups in its molecule or partially hydrolyzed product of the same, constituting the component (B) of the composition according to the present invention, is an indispensable component which is required for room-temperature cure of the composition in the presence of moisture. The hydrolyzable groups include, for example, alkoxyl groups, ketoxime groups, acyloxyl groups, amino groups, amide groups, aminoxyl groups, alkenyloxyl groups, and the like. The organosilicon compound may be a silane or a siloxane compound. Specific examples of the organosilicon compound include the following compounds:

alkoxysilanes such as methyltrimethoxysilane, vinyltriethoxysilane, 3-chloropropyltrimethoxysilane, 3-aminopropyltriethoxysilane, and the like; ketoximesilanes such as methyltris(dimethyl ketoxime)silane, methyltris methyl ethyl ketoxime)silane, vinyltris(-methyl ethyl ketoxime)silane, tetra(methyl ethyl ketoxime)silane, and the like; acyloxysilanes such as vinyltriacetoxysilane, methyltriacetoxysilane, phnnyltriacetoxysilane, and the like; amidosilanes such as phenyltris(N-methylacetamido)silane, vinyltris(N-methylacetamido)silane, and the like; aminosilanes such as vinyltris(N-butylamino)silane, phenyltris(N,N-diethylamino)silane, and the like; aminoxysilanes such as methyltris(N,N-dimethylaminoxy)silane, vinyltris(N,N-diethylaminoxy)silane, and the like; alkenyloxysilanes such as vinyltriisopropenoxysilane, methyltriisobutenyloxysilane, phenyltricyclohexanoxysilane, and the like; and partially hydrolyzed products of one or more of these.

Such organosilicon compounds and partially hydrolyzed products thereof may be used either singly or in combination of two or more.

The component (B) should be used in an amount of from 0.5 to 30 parts by weight per 100 parts by weight of the component (A). If the amount of the component (B) is less than 0.5 part by weight, the composition will gel during production or storage thereof, and elastic materials obtained therefrom will not exhibit the physical properties intended. If the amount is more than 30 parts by weight, on the other hand, the composition will show an excessively high ratio of shrinkage upon cure and, further, elasticity of cured products is lowered.

More preferably, the component (B) is used in an amount of from 3 to 15 parts by weight.

Component (C)

The alkoxysilane having the above general formula (1), constituting the component (C) of the composition of the present invention, acts as a surface coating agent.

In the general formula (1):

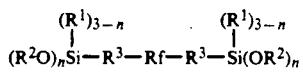

the unsubstituted or substituted monovalent hydrocarbon groups of from 1 to 8 carbon atoms represented by $R^1$ and $R^2$ include, for example, alkyl groups such as methyl, ethyl, propyl, and the like; cycloalkyl groups such as cyclopentyl, cyclohexyl, and the like; alkenyl groups such as vinyl, allyl, and the like; aryl groups such as phenyl, tolyl, and the like; and groups derived from these groups by substitution of halogen atoms or the like for part of the hydrogen atoms of these groups. The divalent groups represented by $R^3$ includes, for example, alkylene groups such as methylene, ethylene, propylene, and the like; cycloalkylene groups such as cyclopentylene, cyclohexylene, and the like; arylene groups such as phenylene, and the like; the groups represented by $-R^4OR^5-$ or $-R^4CONHR^5-$, wherein $R^4$ and $R^5$ may be the same or different from each other and are each a member selected from the group consisting of alkylene groups such as methylene, ethylene, propylene, and the like, cycloalkylene groups such as cyclopentylene, cyclohexylene, and the like, and arylene groups such as phenylene; and so on.

In the above general formula (1), in addition, Rf is a divalent perfluoroalkylene group or a divalent perfluoropolyether group. Specific examples include the groups having the general formula (3):

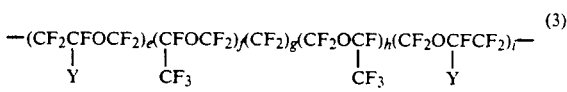

wherein e and i may be the same or different from each other and are each either 0 or 1, f and h may be the same or different from each other and are each an integer from 0 to 30, and g is an integer from 0 to 8, provided the above e, f, g, h and i are integers such that $(e+f+g+h+i) \geq 1$, and a plurality of Y groups may be the same or different from each other and are each a fluorine atom or the group $-CF_3$; the groups having the following general formula (4):

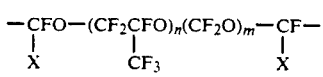

wherein m is an integer from 0 to 10, n is an integer from 2 to 50, and a plurality of X groups may be the same or different from each other and are each a fluorine atom or the group $-CF_3$; and the groups having the following general formula (5):

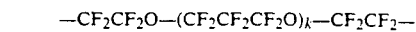

wherein k is an integer from 1 to 100.

Typical examples of the Rf group include the followings:

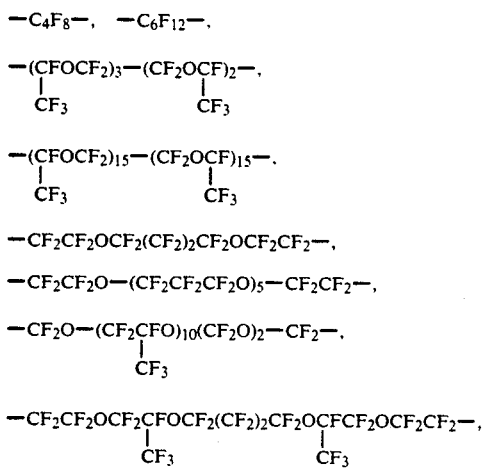

and the like.

Specific examples of the compounds having the general formula (1) above include the following:

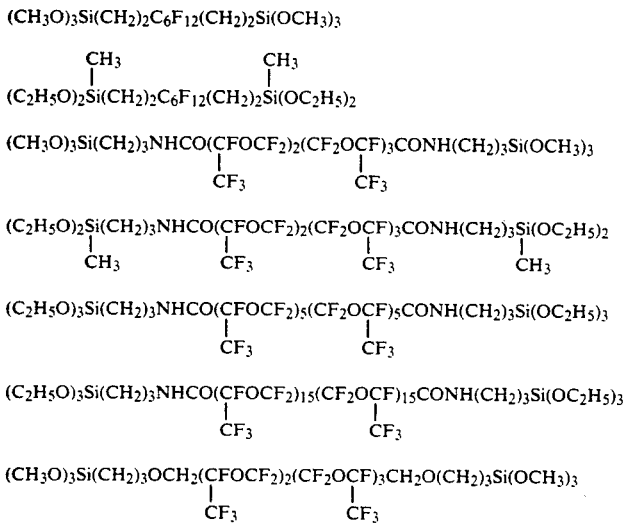

The component (C) is added in an amount of from 0.1 to 15, preferably from 0.5 to 5, parts by weight per 100 parts by weight of the component (A). If the amount of the component (C) is less than 0.1 part by weight, satisfactory coatings are not formed on the surfaces of cured rubber products of the composition of the present invention. If the amount is more than 15 parts by weight, on the other hand, physical properties of rubber-like elastic materials obtained by curing the composition are lowered, and use of such amount is disadvantageous economically.

Preparation of Composition

The composition according to the present invention can be obtained as a one-pack type room temperature curable composition by uniformly mixing predetermined amounts of the above components (A) to (C). Alternatively, the composition may be prepared as a two-pack type composition having a uniform mixture of the components (A) and (C) in one pack and the component (B) in the other, the contents of the two packs being mixed at the time of using the composition.

When the composition is exposed to air, moisture in air causes a crosslinking reaction to proceed, whereby the composition is cured to be a rubber-like elastic material. To the composition, may be added those known catalysts which accelerate this kind of reactions, for example, amine compounds, quaternary ammonium salts, organometallic compounds, titanium chelate compounds, guanidyl group-containing compounds, and the like. Besides, a variety of additives may be added to the composition according to the present invention. The additives which can be used include, for example, inorganic fillers for controlling physical properties of the desired rubber-like elastic material, for instance, known powder-form fillers serving as reinforcing agent, such as fumed silica, precipitated silica, titanium dioxide, aluminum oxide, ground quartz, talc and the like, fibrous fillers such as asbestos, glass fibers, organic fibers and the like, oil resistance improving agents such as potassium methacrylate and the like, coloring agents, heat resistance improving agents such as red oxide and the like, cold resistance improving agents, thixotropic agents such as polyether and the like, dehydrating agents, adhesive property improving agents such as gammaaminopropyltriethoxysilane, and so on. These additives can be added in appropriate amounts, as required.

Use

The composition of the present invention is non-contaminating and ensures easy removal of fungi or the like from surfaces of cured products thereof. Because of these characteristics, the composition is of use as a sealant or coating material for exterior surfaces of buildings, or a sealant or coating material for places where propagation of fungi is likely to occur, such as bathrooms, kitchens and the like.

Operation

The above-described components (A) and (B) are compounds which are known as components of room temperature curable silicone rubber compositions. The composition according to the present invention turns to be a rubber-like elastic material through condensation between the hydroxyl group in the component (A) and the hydrolyzable group in the component (B).

The action of the component (C) ensures that when the composition of the present invention is used as a sealant or coating material, no contamination occurs on surfaces of cured products of the composition or in the surroundings. It is also ensured that even if the composition is used in bathrooms, kitchens, toilets or other places where contamination by such contaminants as dirt from human bodies, detergents, foods, etc. and propagation of fungi tend to occur under poor ventilation and highly humid conditions, the fungi can be easily removed.

EXAMPLES

Some examples of the present invention will now be described below, in which "parts" means "parts by weight" and viscosity is given in values measured at 25° C.

Examples 1 to 3, Comparative Example 1

One hundred parts of a dimethylpolysiloxane blocked by hydroxyl group at both terminal ends of its molecular chain and having a viscosity of 20,200 cSt was mixed with 12 parts of fumed silica whose surfaces have been treated with hexamethyldisilazane and which has a specific surface area of 150 m$^2$/g and 1.5 parts of titanium dioxide. The resulting mixture was passed once through a three-roll mill. To the composition thus treated, 7 parts of methyltributanoximesilane and 0.1 part of dibutyltin dioctoate were added, followed by mixing with defoaming under water-free conditions, to prepare a composition (Composition I).

Next, the composition I obtained above was admixed with 1.0 part, 3.0 parts, and 5.0 parts, respectively, of a perfluoropolyether-silane having the following structural formula:

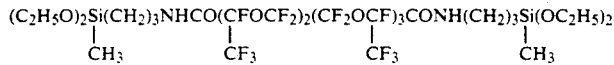

to prepare three compositions Composition II, Composition III, and Composition IV.

Mechanical Properties

The compositions I, II, III and IV prepared as above were formed into 2 mm thick sheets. When the sheets were left to stand in an atmosphere of a temperature of 20° C. and a relative humidity of 55% for 7 days, each of the sheets was cured to be a rubber-like elastic material. In addition, all of the compositions I, II, III and IV remained stable for 6 months or more when left at room temperature under hermetically sealed conditions. When the compositions I, II, III and IV having thus been left under the hermetically sealed conditions for 6 months were formed into 2 mm thick sheets and the sheets were cured under the same conditions as above, each of the sheets was cured to be a rubber-like elastic material. The rubber-like elastic materials formed from the compositions in the beginning and the rubber-like elastic materials formed from the compositions after 6 months, as described above, were subjected to. measurement of rubber properties according to the methods specified in JIS C 2123. Hardness was measured according to the spring hardness test (Type A) provided in the JIS. The results are shown in Tables 1 and 2 below.

TABLE 1

| (in the beginning) | | | | |
|---|---|---|---|---|
| | Comp. Ex. 1 Composition I | Ex. 1 Composition II | Ex. 2 Composition III | Ex. 3 Composition IV |
| Hardness | 29 | 31 | 32 | 34 |
| Tensile strength (kg/cm$^2$) | 20 | 22 | 21 | 23 |
| Elongation (%) | 380 | 390 | 360 | 350 |

TABLE 2

| (after 6 months at room temperature) | | | | |
|---|---|---|---|---|
| | Comp. Ex. 1 Composition I | Ex. 1 Composition II | Ex. 2 Composition III | Ex. 3 Composition IV |
| Hardness | 28 | 31 | 33 | 33 |
| Tensile strength (kg/cm$^2$) | 19 | 21 | 19 | 22 |
| Elongation (%) | 400 | 380 | 370 | 360 |

Adhesive Property

Subsequently, as shown in FIG. 1, a sealant 2 consisting of the above-described composition I was applied, in an area of 25×10 mm, to an end portion on one side of an adherend 1, measuring 100×25×10 mm. Two 1-mm-thick Teflon plates were placed on the adherend 1 as spacers 3 and 3' on opposite sides of the sealant 2; then, another adherend 1' made of the same material as the adherend 1 was placed on the spacers 3 and 3', and a 500-g weight 4 was placed thereon. The assembly thus formed was left to stand in an atmosphere of 20° C. and 55% RH for 7 days to cure the sealant, thereby preparing a specimen. With the compositions II, III and IV also, specimens were prepared in the same manner as with the composition I. As the adherend 1 (1'), sheets of a glass, aluminum, iron, and an epoxy resin were used. For each of the specimens thus obtained, adhesive strength under shear was measured by pulling both ends of the specimen in opposite directions. The results are shown in Table 3.

TABLE 3

| Adherend | Comp. Ex. 1 Composition I | Ex. 1 Composition II | Ex. 2 Composition III | Ex. 3 Composition IV |
|---|---|---|---|---|
| Glass | 10 | 9 | 11 | 9 |
| Aluminum | 11 | 10 | 10 | 11 |
| Iron | 9 | 9 | 11 | 9 |
| Epoxy resin | 10 | 9 | 10 | 10 |

Contact Angle

Contact angle measurement was carried out for pure water and a silicone oil (viscosity: 10 cSt) on cured sheets of the compositions I, II, III and IV, by using a contact angle measuring instrument produced by Kyowa Kaimen Kagaku K. K.. The results are shown in Table 4.

TABLE 4

| | Comp. Ex. 1 Composition I | Ex. 1 Composition II | Ex. 2 Composition III | Ex. 3 Composition IV |
|---|---|---|---|---|
| Pure water | 108 | 109 | 110 | 115 |
| Silicone oil | 0 | 15 | 22 | 25 |

Contamination Resistance

Two square plates of granite measuring 300×300×15 mm were laid flat on a level-surfaced base so that a pair of corresponding end faces (measuring 300×15 mm) of the plates were in parallel and close to each other, leaving a 15 mm gap therebetween. Each of the compositions I, II, III and IV was placed to fill up the gap (filling space dimensions: 300×15×15 mm), and was cured. In this manner, four kinds of specimens were prepared.

The specimens obtained as above were left to stand outdoors, and contamination on surfaces of the cured products and in the surroundings was examined after 3 months, 6 months, and 12 months. The results are shown in Table 5.

TABLE 5

| Example | Composition | Contamination, measured after | | |
|---|---|---|---|---|
| | | 3 months | 6 months | 12 months |
| Comparative Example 1 | Composition I | B | C | C |
| Example 1 | Composition II | A | B | B |
| Example 2 | Composition III | A | A | A |
| Example 3 | Composition IV | A | A | A |

Notes:
A - No contamination observed.
B - Slight contamination observed.
C - Heavy contamination observed.

Fungal Resistance

Cured sheets formed from the compositions I, II, III and IV in the same manner as in the above tests of mechanical properties were respectively blanked into circular disks of 30 mm in diameter, which were subjected to measurement of fungal resistance by the "Methods of testing fungal resistance" according to JIS Z 2911. In addition, removability of fungi deposited on the back side of each of the cured sheets was evaluated. The results are shown in Table 6.

TABLE 6

| Composition | 7 days | 14 days | 21 days | 28 days | Removability of mildew |
|---|---|---|---|---|---|
| Composition I | − | − | + | + | C |
| Composition II | − | − | − | + | B |
| Composition III | − | − | − | − | A |
| Composition IV | − | − | − | − | A |

Notes:
- Evaluation criteria for fungal resistance:
−: No propagation of fungi on specimen
+: Propagation of fungi on specimen was observed over an area of not more than ¼ times the whole area.
- Evaluation criteria for removability of fungi:
Fungi deposited on the cured sheet was wiped off with tissue.
A: Easily removable (Removable by a single wipe)
B: Removable (Removable by a few wipes)
C: Difficult to remove (Unremovable, even by several wipes)

Examples 4 to 6, Comparative Example 2

One hundred parts of a dimethylpolysiloxane blocked by hydroxyl group at both terminal ends of its molecular chain and having a viscosity of 20,500 cSt was mixed with 12 parts of fumed silica whose surfaces have been treated with hexamethyldisilazane and which has a specific surface area of 150 m$^2$/g and 1.5 parts of titanium dioxide. The resulting mixture was passed once through a three-roll mill. To the composition thus treated, 6 parts of methyltriisopropenoxysilane and 0.5 part of a guanidyl-containing silane having the following structural formula:

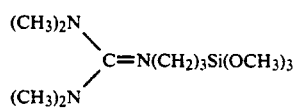

were added, followed by mixing with defoaming under water-free conditions, to prepare a composition (Composition V).

Next, the composition V obtained above was admixed with 1.0 part, 3.0 parts, and 5.0 parts, respectively, of a perfluoropolyether-silane having the following structural formula:

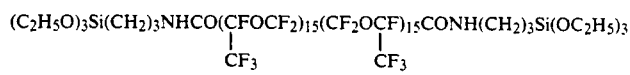

to prepare three compositions Composition VI, Composition VII, and Composition VIII.

Mechanical Properties

The compositions V, VI, VII and VIII prepared as above were formed into 2 mm thick sheets. When the sheets were left to stand in an atmosphere of a temperature of 20° C. and a relative humidity of 55% for 7 days, each of the sheets was cured to be a rubber-like elastic material. In addition, all of the compositions V, VI, VII and VIII remained stable for 6 months or more when left at room temperature under hermetically sealed conditions. When the compositions V, VI, VII and VIII having thus been left under the hermetically sealed conditions for 6 months were formed into 2 mm thick sheets and the sheets were cured under the same conditions as above, each of the sheets was cured to be a rubber-like elastic material. The rubber-like elastic materials formed from the compositions in the beginning and the rubber-like elastic materials formed from the compositions after 6 months, as described above, were subjected to measurement of rubber properties according to the methods specified in JIS C 2123. Hardness was measured according to the spring hardness test (Type A) provided in the JIS. The results are shown in Tables 7 and 8 below.

TABLE 7

| | (in the beginning) | | | |
|---|---|---|---|---|
| | Comp. Ex. 2 Composition V | Ex. 4 Composition VI | Ex. 5 Composition VII | Ex. 6 Composition VIII |
| Hardness | 25 | 26 | 27 | 28 |
| Tensile strength (kg/cm$^2$) | 21 | 22 | 23 | 21 |
| Elongation (%) | 420 | 420 | 420 | 390 |

TABLE 8

(after 6 months at room temperature)

| | Comp. Ex. 2 Composition V | Ex. 4 Composition VI | Ex. 5 Composition VII | Ex. 6 Composition VIII |
|---|---|---|---|---|
| Hardness | 26 | 28 | 29 | 29 |
| Tensile strength (kg/cm$^2$) | 23 | 22 | 21 | 23 |
| Elongation (%) | 390 | 400 | 410 | 390 |

Adhesive Property

In the same manner as in Example 1 above, specimens as shown in FIG. 1 were formed from the compositions V, VI, VII and VIII, with the surfaces of coatings cured under the same conditions as in Example 1, and the specimens thus obtained were subjected to measurement of adhesive strength under shear. The results are shown in Table 9 below.

TABLE 9

| Adherend | Comp. Ex. 2 Composition V | Ex. 4 Composition VI | Ex. 5 Composition VII | Ex. 6 Composition VIII |
|---|---|---|---|---|
| Glass | 9 | 11 | 9 | 9 |
| Aluminum | 11 | 11 | 9 | 11 |
| Iron | 10 | 9 | 10 | 9 |
| Epoxy resin | 11 | 10 | 9 | 9 |

Contact Angle

Contact angle measurement was carried out for pure water and a silicone oil (viscosity: 10 cSt) on cured sheets of the compositions V, VI, VII and VIII, by using a contact angle measuring instrument produced by Kyowa Kaimen Kagaku K. K. The results are shown in Table 10.

TABLE 10

| | Comp. Ex. 2 Composition V | Ex. 4 Composition VI | Ex. 5 Composition VII | Ex. 6 Composition VIII |
|---|---|---|---|---|
| Pure water | 105 | 107 | 106 | 103 |
| Silicone oil | 0 | 19 | 26 | 33 |

Contamination Resistance

Two square plates of granite measuring 300×300×15 mm were laid flat on a level-surfaced base so that a pair of corresponding end faces (measuring 300×15 mm) of the plates were in parallel and close to each other, leaving a 15 mm gap therebetween. Each of the compositions V, VI, VII and VIII was placed to fill up the gap (filling space dimensions: 300×15×15 mm), and was cured. In this manner, four kinds of specimens were prepared.

The specimens obtained as above were left to stand outdoors, and contamination on surfaces of the cured products and in the surroundings was examined after 3 months, 6 months, and 12 months. The results are shown in Table 11.

TABLE 11

| Example | Composition | Contamination, measured after | | |
|---|---|---|---|---|
| | | 3 months | 6 months | 12 months |
| Comparative Example 2 | Composition V | B | C | C |
| Example 4 | Composition VI | A | B | C |
| Example 5 | Composition VII | A | A | A |
| Example 6 | Composition VIII | A | A | A |

Notes:
A - No contamination observed.
B - Slight contamination observed.
C - Heavy contamination observed.

Fungal Resistance

Cured sheets formed of the compositions V, VI, VII and VIII were respectively blanked into circular disks of 30 mm in diameter, which were subjected to measurement of fungal resistance by the "Methods of testing fungal resistance" according to JIS Z 2911. In addition, removability of fungi deposited on the black side of each of the cured sheets was evaluated in the same manner as in Example 1. The results are shown in Table 12.

TABLE 12

| Composition | 7 days | 14 days | 21 days | 28 days | Removability of mildew |
|---|---|---|---|---|---|
| Composition V | − | − | + | + | C |
| Composition VI | − | − | + | + | B |
| Composition VII | − | − | − | + | A |
| Composition VIII | − | − | − | + | A |

Notes:
- Evaluation criteria for fungal resistance:
−: No propagation of fungi on specimen
+: Propagation of fungi on specimen was observed over an area of not more than ¼ times the whole area.
- Evaluation criteria for removability of fungi:
Fungi deposited on the cured sheet was wiped off with tissue.
A: Easily removable (Removable by a single wipe)
B: Removable (Removable by a few wipes)
C: Difficult to remove (Unremovable, even by several wipes)

Examples 7 to 9, Comparative Example 3

One hundred parts of a dimethylpolysiloxane blocked by hydroxyl group at both terminal ends of its molecular chain and having a viscosity of 21,200 cSt was mixed with 12 parts of fumed silica whose surfaces have been treated with hexamethyldisilazane and which has a specific surface area of 120 m$^2$/g and 1.5 parts of titanium dioxide. The resulting mixture was passed once through a three-roll mill. To the composition thus treated, 6 parts of methyltributanoxysilane and 0.1 part of dibutyltin dioctoate were added, followed by mixing with defoaming under water-free conditions, to prepare a composition (Composition A).

Next, the composition A thus obtained was admixed respectively with 3 parts each of perfluoropolyethersilanes having the following formulas:

Composition IX:
(CH$_3$O)$_3$Si(CH$_2$)$_2$C$_6$F$_{12}$(CH$_2$)$_2$Si(OCH$_3$)$_3$ Composition X:
(CH$_3$O)$_3$Si(CH$_2$)$_3$NHCO(CFOCF$_2$)$_2$(CF$_2$OCF)$_3$CONH(CH$_2$)$_3$Si(OCH$_3$)$_3$
　　　　　　　　　　　　　　|　　　　　　　　|
　　　　　　　　　　　　　　CF$_3$　　　　　CF$_3$ Composition XI:

-continued

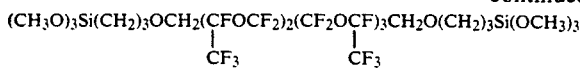

Composition XII:

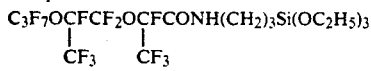

to prepare four compositions-Composition IX, Composition X, Composition XI, and Composition XII.

The compositions IX, X, XI and XII thus obtained were subjected to outdoor exposure tests and fungal resistance tests in the same manner as in Example 1. The results are shown in Table 13 and 14 below.

TABLE 13

| Example | Composition | Contamination, measured after | | |
|---|---|---|---|---|
| | | 3 months | 6 months | 12 months |
| Comparative Example 3 | Composition V | B | B | C |
| Example 7 | Composition IX | A | A | B |
| Example 8 | Composition X | A | A | A |
| Example 9 | Composition XI | A | A | B |

Notes:
A - No contamination observed.
B - Slight contamination observed.
C - Heavy contamination observed.

TABLE 14

| Composition | 7 days | 14 days | 21 days | 28 days | Removability of mildew |
|---|---|---|---|---|---|
| Composition IX | — | — | — | + | A |
| Composition X | — | — | — | — | A |
| Composition XI | — | — | — | + | A |
| Composition XII | — | — | — | — | A |

Notes:
Evaluation criteria for fungal resistance:
—: No propagation of fungi on specimen.
+: Propagation of fungi on specimen was observed over and area of not more than ⅓ times the whole area.
Evaluation criteria for removability of fungi:
A: Easily removable
B: Removable
C: Difficult to remove

We claim:

1. A room temperature curable organopolysiloxane composition comprising:
   (A) 100 parts by weight of a diorganopolysiloxane blocked by hydroxyl group at both terminal ends of its molecule,
   (B) from 0.5 to 30 parts by weight of an organosilicon compound having at least three silicon-bonded hydrolyzable groups in its molecule or a partially hydrolyzed product of said organosilicon compound,
   (C) from 0.1 to 15 parts by weight of an alkoxysilane having the following general formula (1):

TABLE 12

| Composition | 7 days | 14 days | 21 days | 28 days | Removability of mildew |
|---|---|---|---|---|---|
| Composition IX | — | — | — | + | A |
| Composition X | — | — | — | — | A |
| Composition XI | — | — | — | + | A |

TABLE 12-continued

| Composition | 7 days | 14 days | 21 days | 28 days | Removability of mildew |
|---|---|---|---|---|---|
| Composition XII | — | — | — | — | A |

Notes:
- Evaluation criteria for fungal resistance:
—: No propagation of fungi on specimen
+: Propagation of fungi on specimen was observed over an area of not more than ⅓ times the whole area.
- Evaluation criteria for removability of fungi:
A: Easily removable
B: Removable
C: Difficult to remove

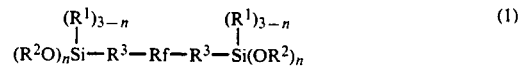

wherein $R^1$ and $R^2$ are each an unsubstituted or substituted monovalent hydrocarbon group of from 1 to 8 carbon atoms, $R^3$ is a divalent hydrocarbon group of from 1 to 8 carbon atoms which may contain an amide linkage (—CONH—) or an ether oxygen linkage, Rf is a divalent perfluoroalkylene group or a divalent perfluoropolyether group, and n is an integer from 1 to 3.

2. The composition according to claim 1, wherein said component (A) comprises a compound having the following general formula (2):

wherein R' and R" may be the same or different from each other and are each a member selected from the group consisting of alkyl groups, cycloalkyl groups, alkenyl groups, aryl groups, and groups derived from these groups by substitution of halogen atoms for part of the hydrogen atoms of these groups; and n is an integer of 10 or above.

3. The composition according to claim 1, wherein said hydrolyzable group in said component (B) is at least one member selected from the group consisting of alkoxyl, ketoxime, acyloxyl, amino, amide, aminoxyl, and alkenyloxyl groups.

4. The composition according to claim 1, wherein said group $R^1$ in the above general group (1) is at least one member selected from the group consisting of alkyl groups, cycloalkyl groups, alkenyl groups, aryl groups, and groups derived from these groups by substitution of halogen atoms for part of the hydrogen atoms of these groups.

5. The composition according to claim 1, wherein said group $R^2$ in the above general formula (1) is at least one member selected from the group consisting of alkyl groups, cycloalkyl groups, alkenyl groups, aryl groups, and groups derived from these groups by substitution of halogen atoms for part of the hydrogen atoms of these groups.

6. The composition according to claim 1, wherein said group $R^3$ in the above general formula (1) is at least one member selected from the group consisting of alkylene groups, cycloalkylene groups, arylene groups, and the groups having the formulas:

—$R^4OR^5$—, and
—$R^4CONHR^5$— wherein $R^4$ and $R^5$ may be the same or different from each other and are each at least one member selected from the group consisting of alkylene, cycloalkylene and arylene groups.

7. The composition according to claim 1, wherein said group Rf is a member selected from the group consisting of the groups having the following general formulas (3) to (5):

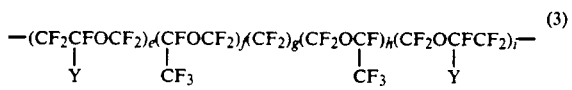  (3)

wherein e and i may be the same or different from each other and are each either 0 or 1, f and h may be the same or different from each other and are each an integer from 0 to 30, and g is an integer from 0 to 8, provided the above e, f, g, h and i are integers such that $(e+f+g+h+i)\geq 1$, and a plurality of Y groups may be the same or different from each other and are each a fluorine atom or the group —$CF_3$;

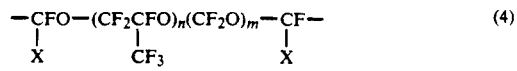  (4)

wherein m is an integer from 0 to 10, n is an integer from 2 to 50, and a plurality of X groups may be the same or different from each other and are each a fluorine atom or the group —$CF_3$;

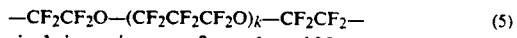  (5)

wherein k is an integer from 1 to 100.

8. The composition according to claim 1, wherein said component (B) is present in an amount of from 3 to 15 parts by weight.

9. The composition according to claim 1, wherein said component (C) is present in an amount of from 0.5 to 5 parts by weight.

10. A cured product obtained by curing the composition of claim 1.

* * * * *